United States Patent
Kawamoto et al.

(10) Patent No.: US 8,723,080 B2
(45) Date of Patent: May 13, 2014

(54) ARC WELDING CONTROL METHOD AND ARC WELDING APPARATUS

(75) Inventors: Atsuhiro Kawamoto, Hyogo (JP); Yasushi Mukai, Osaka (JP); Junji Fujiwara, Osaka (JP); Masaru Kowa, Osaka (JP); Toshiyuki Mishima, Osaka (JP)

(73) Assignee: Panasonic Corporation, Osaka (JP)

( * ) Notice: Subject to any disclaimer, the term of this patent is extended or adjusted under 35 U.S.C. 154(b) by 165 days.

(21) Appl. No.: 13/063,487

(22) PCT Filed: Jul. 6, 2010

(86) PCT No.: PCT/JP2010/004402
§ 371 (c)(1),
(2), (4) Date: Mar. 11, 2011

(87) PCT Pub. No.: WO2011/004586
PCT Pub. Date: Jan. 13, 2011

(65) Prior Publication Data
US 2012/0097654 A1    Apr. 26, 2012

(30) Foreign Application Priority Data
Jul. 10, 2009  (JP) ................................ 2009-163440

(51) Int. Cl.
*B23K 9/12* (2006.01)
(52) U.S. Cl.
USPC .................................. 219/125.1; 219/130.1
(58) Field of Classification Search
USPC ........ 219/125.1, 130.1–130.51, 137.2, 137.7, 219/137.71
See application file for complete search history.

(56) References Cited

U.S. PATENT DOCUMENTS

| 4,288,682 | A  | * | 9/1981  | Toth .......................... 219/137.71 |
| 6,207,928 | B1 | * | 3/2001  | Kawamoto et al. ...... 219/130.51 |
| 6,627,850 | B1 | * | 9/2003  | Koga et al. ............... 219/137.71 |
| 2006/0138115 | A1 | * | 6/2006 | Norrish et al. ........... 219/137.71 |
| 2006/0283847 | A1 | * | 12/2006 | Kawamoto et al. ..... 219/137 PS |
| 2009/0242534 | A1 | | 10/2009 | Artelsmair et al. |

FOREIGN PATENT DOCUMENTS

| CN | 1803369 A | 7/2006 |
| CN | 101239415 A | 8/2008 |
| CN | 101269437 A | 9/2008 |
| EP | 1681123 B1 | 3/2013 |
| JP | 2002-086270 A | 3/2002 |

(Continued)

OTHER PUBLICATIONS

International Search Report for Application No. PCT/JP2010/004402, Oct. 12, 2010, Panasonic Corporation.

*Primary Examiner* — Sang Y Paik
(74) *Attorney, Agent, or Firm* — RatnerPrestia

(57) ABSTRACT

An arc welding control method for carrying out welding by generating an arc between a wire and a base material. The wire is fed at wire feed speed (Wf) of periodically repeating forward feeding and reverse feeding with predetermined frequency and amplitude from time point (100) at which start of the welding is instructed, or from a certain time point (101) after the start of the welding is instructed, and then the wire feed speed is changed to a constant speed. Since the wire feed speed is controlled by periodically repeating forward feeding and reverse feeding at the arc start, short-circuit can be opened regardless of the electromagnetic pinch force, and spatters, which are generated at the early stage of the arc start because a molten pool is not preset, can be reduced.

16 Claims, 6 Drawing Sheets

(56) References Cited

FOREIGN PATENT DOCUMENTS

| JP | 2002-086270 A | 3/2002 |
| JP | 2005-288454 A | 10/2005 |
| JP | 2005-288454 A | 10/2005 |
| JP | 2006-116561 A | 5/2006 |
| JP | 2006-192463 A | 7/2006 |
| WO | WO 2007/115342 A1 | 10/2007 |

* cited by examiner

ARC WELDING CONTROL METHOD AND ARC WELDING APPARATUS

This Application is a U.S. National Phase Application of PCT International Application PCT/JP2010/004402.

TECHNICAL FIELD

The present invention relates to a consumable electrode type arc welding method for carrying out welding by alternately generating a short-circuit state and an arc state while feeding a welding wire as a consumable electrode, and an arc welding apparatus.

BACKGROUND ART

In recent years, in welding industry, in order to improve productivity, the need for improving the quality of welding has been increased. Especially, reduction of spatters at the start of an arc has been required. At the start of an arc, since it takes a long time to form a molten pool on a base material, it takes a long time for the arc to be stabilized, so that it is more likely that generation of spatters increases and the spatters adhere to the base material. Therefore, aftertreatment for removing the adhering spatters is needed, and the welding productivity may be reduced. Furthermore, if a product is distributed in a state in which spatters adhere to a base material without carrying out aftertreatment, the product value may be remarkably damaged.

As a conventional arc start control, it is known that at least one pulse wave-like electric current is supplied by pulse control at the start of an arc, a molten pool to be firstly formed on the base material is formed by separation and shift, and, after the pulse wave-like electric current is supplied, pulse control is changed from pulse control to short-circuit control. In such a conventional arc start control, a torch for feeding a wire as an electrode is mounted on the tip end of an arm of an arc-welding robot, and starting control is carried out at the lift-up starting time for lifting up the arm tip at the start of an arc. In a state in which a molten pool is not formed on the base material at the early stage of the arc start, with the aim of separating and shifting a droplet from the tip end of the wire to form a molten pool, a pulse wave-like current is output so as to reduce the generation of spatters (see, for example, Patent Document 1).

FIG. 4 shows a schematic configuration of a conventional arc welding apparatus. In FIG. 4, primary-side rectifying element 3 rectifies an output of input power source 1 and outputs the rectified output. Switching element 4 converts a direct current output from primary rectifying element 3 into an alternating current so as to control a welding output. Main transformer 2 transforms the alternating current output of switching element 4. An output of main transformer 2 is output as a welding output via secondary-side rectifying element 6 for rectifying the secondary-side output of main transformer 2 and reactor 5.

Setting section 35 sets and outputs various parameters such as magnitude of a pulse current and a pulse time based on the setting conditions such as a set current, a set voltage, an amount of fed wire, types of shielding gases, types of wires, a wire diameter, and a welding method, which are input from an input unit (not shown) and the like. Setting section 35 includes a storage section (not shown) for storing table or formula for determining the above-mentioned parameters and a calculation section (not shown) for carrying out calculation and the like, with which parameters are set.

Welding voltage detector 9 detects a welding voltage, and welding current detector 8 detects a welding current. Pulse welding control unit 37 receives inputs of an output of welding current detector 8, an output of welding voltage detector 9 and an output of setting section 35, and outputs a command to control pulse welding. Pulse welding control unit 37, as mentioned below, controls to allow a pulse-like current to flow for a predetermined time after an arc start current for generating an arc flows. Short-circuit welding control unit 36 receives inputs of an output of welding current detector 8, an output of welding voltage detector 9 and an output of setting section 35, and outputs a command to carry out control. Pulse welding control unit 37 and short-circuit welding control unit 36 have, for example, a function of comparing respective output signals from welding current detector 8 and welding voltage detector 9 with parameter values (command values) and controlling a welding current and a welding voltage to coincide with the parameter values, so that the welding current and welding voltage correspond to the parameter values (command value) input from setting section 35.

Changing section 38 receives an input of the output of setting section 35, and outputs a timing of changing from pulse welding control to short-circuit welding control to driving section 34. Changing section 38 has a timer function and can count a time until a predetermined time has passed from a time point at which an output of setting section 35 is input. Driving section 34 has a function of receiving an input of the output of short-circuit welding control unit 36, the output of pulse welding control unit 37 and the output of changing section 38, and changing between outputting the output of short-circuit welding control unit 36 to switching element 4 and outputting the output of pulse welding control unit 37 to switching element 4 according to the output of changing section 38.

A control method of the arc start by a conventional arc welding apparatus configured as mentioned above is described with reference to drawings.

FIG. 5 shows examples of waveforms of a wire feed speed, a welding voltage and a welding current at the time of welding of consumable electrode arc welding. FIG. 5 shows an example of a waveform in which the start of welding is instructed at time point 200, an arcing current flows and arc is generated at time point 201, then pulse wave-like welding current Aw flows twice by pulse welding control, and the control state is then changed to the short-circuit welding control at time point 202.

At time point 201 as a time point at which an arc is generated, driving section 34 outputs the output of pulse welding control unit 37 to switching element 4 based on the input from changing section 38. Furthermore, changing section 38 counts an elapsed time from time point 201 at which welding current Aw is detected. Thereafter, at time point 202 at which a predetermined time has passed, to change welding control from the pulse welding control to the short-circuit welding control, driving section 34 controls the output of short-circuit welding control 36 to be output to switching element 4.

With this control, during interval 203 from time point 201 as a time starting point at which an arc is generated to time point 202 as a changing time point, pulse control is carried out based on the output of pulse welding control unit 37, and a droplet at the tip end of a welding wire (not shown) is separated and shifted to a base material (not shown). Thereafter, at time point 202 as a changing time point after a predetermined time has passed from time point 201 as an arc generating time point, changing section 38 sends a change instruction to driving section 34, and thereby the output of short-circuit control unit 36 is output to switching element 4, and the welding output control is changed from the pulse welding control to the short-circuit welding control. Thereafter, during interval 204 after changing time point 202, short-circuit control is carried out by short-circuit welding control unit 36.

As mentioned above, in conventional arc start control method and arc welding apparatus, after an arc start current flows, at least one pulse wave-like current is supplied by pulse control, and a molten pool firstly formed on a base material can be formed by separation and shift. Thus, a droplet on the wire tip end can be shifted to be short-circuited smoothly, and generation of spatters and adhesion of spatters can be reduced during the time after an arc is generated before the arc is stabilized.

Furthermore, by combining the above-mentioned arc welding machine and an arc welding robot and mounting a welding wire as an electrode on the tip end of the arm of the arc welding robot, the above-mentioned arc start control may be carried out when the lift-up starting is executed in which the tip end of the arm is lifted up at the arc starting time. When lift-up is carried out at time point 201 as an arc generating time point, the welding wire is prevented from being melted to generate spatters in a short-circuit state, and spatters are reduced at time point 201 as an arc generating time point. Furthermore, the lift-up makes it possible to obtain the distance between the wire tip end and the base material instantaneously. That is to say, since it is possible to instantaneously obtain a distance that is larger than the size of a droplet at the pulse controlling time, short-circuit does not occur, and separation and shift can be carried out smoothly. Thus, generation and adhesion of spatters can be further reduced.

In this way, output control in a conventional arc welding machine has an effect of reducing the amount of spatters generated at the start of an arc by separating and shifting a droplet from the tip end of the wire by pulse welding control and forming a molten pool on the base material.

The shift of a droplet when a molten pool is formed is described with reference to drawings. In the shift of a droplet when a molten pool is formed, as shown in, for example, FIG. 6 (the upper part shows a state of shifting a droplet, and the lower part shows a welding current (A)), since arc 52 is generated from the entire part of molten pool 51 on base material 50, arc 52 is spread and covers a wide range of the lower part of droplet 53a at the tip end of wire 53. Therefore, since the current density is low and an electromagnetic pinch force by peak current 55 of pulse current 54 is large, the effect of pushing up the droplet is reduced, and the droplet is smoothly separated and shifted to molten pool 51 from the tip end of wire 53. Note here that wire 53 is fed in a state in which it is held by chip 56.

However, as shown in, for example, FIG. 7 (the upper part shows a state of shifting a droplet, and the lower part shows a welding current (A)), since a portion in which an arc is generated in the early stage of the arc start does not have a molten pool on base material 50, arc 52 is concentrated in a thin portion, a current density of the lower part of droplet 53a at the tip end of wire 53 becomes higher, and a force for pushing up droplet 53a works. Since this push-up force may become larger than the electromagnetic pinch force in many cases, large droplet 53a does not shift in the direction of base material 50, but it is pushed up in a direction different from that of base material 50. Therefore, when droplet 53a is separated from the tip end of wire 53, as shown in FIG. 7, some droplets 53a may scatter as spatters 53b. If spatters 53b are scattered, they may adhere to base material 50 and may not be able to be detached. In other words, the amount of spatters 53b to be generated can be reduced also in conventional control, but spatters 53b that may be generated by the above-mentioned push-up force are not sufficiently handled, so that large size of spatters 53b may be generated and adhere to base material 50.

The present invention provides an arc start control method and an arc welding apparatus for reducing an amount of spatters generated from a time when an arc is generated to a time when the arc is stabilized.

CITATION LIST

[Patent Document] Japanese Patent Application Unexamined Publication No. 2006-116561

SUMMARY OF THE INVENTION

An arc welding control method of the present invention is a method for carrying out welding by generating an arc between a welding wire as a consumable electrode and a material to be welded. The method includes: feeding the welding wire at a wire feed speed of periodically repeating forward feeding and reverse feeding with predetermined frequency and amplitude from a time point at which a start of the welding is instructed, or from a certain time point after the start of the welding is instructed; and then changing the wire feed speed to a constant speed.

Furthermore, an arc welding apparatus of the present invention carries out welding by generating an arc between a welding wire as a consumable electrode and a material to be welded. The arc welding apparatus includes: a switching element for controlling a welding output; a welding voltage detector for detecting a welding voltage; a welding current detector for detecting a welding current; a welding condition setting section for setting a set current and a set voltage; and a short-circuit/arc detector for detecting whether a state between the welding wire and the material to be welded is a short-circuit state or an arc state, based on an output of the welding voltage detector. The arc welding apparatus of the present invention further includes: a welding start instruction section for instructing a start of the welding; a timer section for counting a predetermined time from a time point as a starting time point for detecting an electric current flowing when the welding wire and the material to be welded are brought into contact with each other after the welding is started; a wire feed speed control unit for controlling the wire feed speed by receiving an output of the short-circuit/arc detector and an output of the timer section, and an output control unit for controlling an output of the welding current or the welding voltage according to an output of the short-circuit/arc detector and the welding wire feed speed. Furthermore, in the arc welding apparatus of the present invention, the welding wire is fed at the wire feed speed of periodically repeating forward feeding and reverse feeding with predetermined frequency and amplitude from a time point at which the start of the welding is instructed by the welding start instruction section, or from a certain time point after the start of the welding is instructed, and then the wire feed speed is changed to a constant speed.

With such a configuration, at the start of an arc, by periodically repeating the wire feed speed between the forward feeding and the reverse feeding with predetermined frequency and amplitude so as to control the wire feed speed, short-circuit can be forcedly opened regardless of an electromagnetic pinch force. Thus, not only a large-size spatter can be reduced but also the amount of spatters to be generated can be reduced.

DETAILED DESCRIPTION OF THE PREFERRED EMBODIMENT

First Exemplary Embodiment

Figure 1:
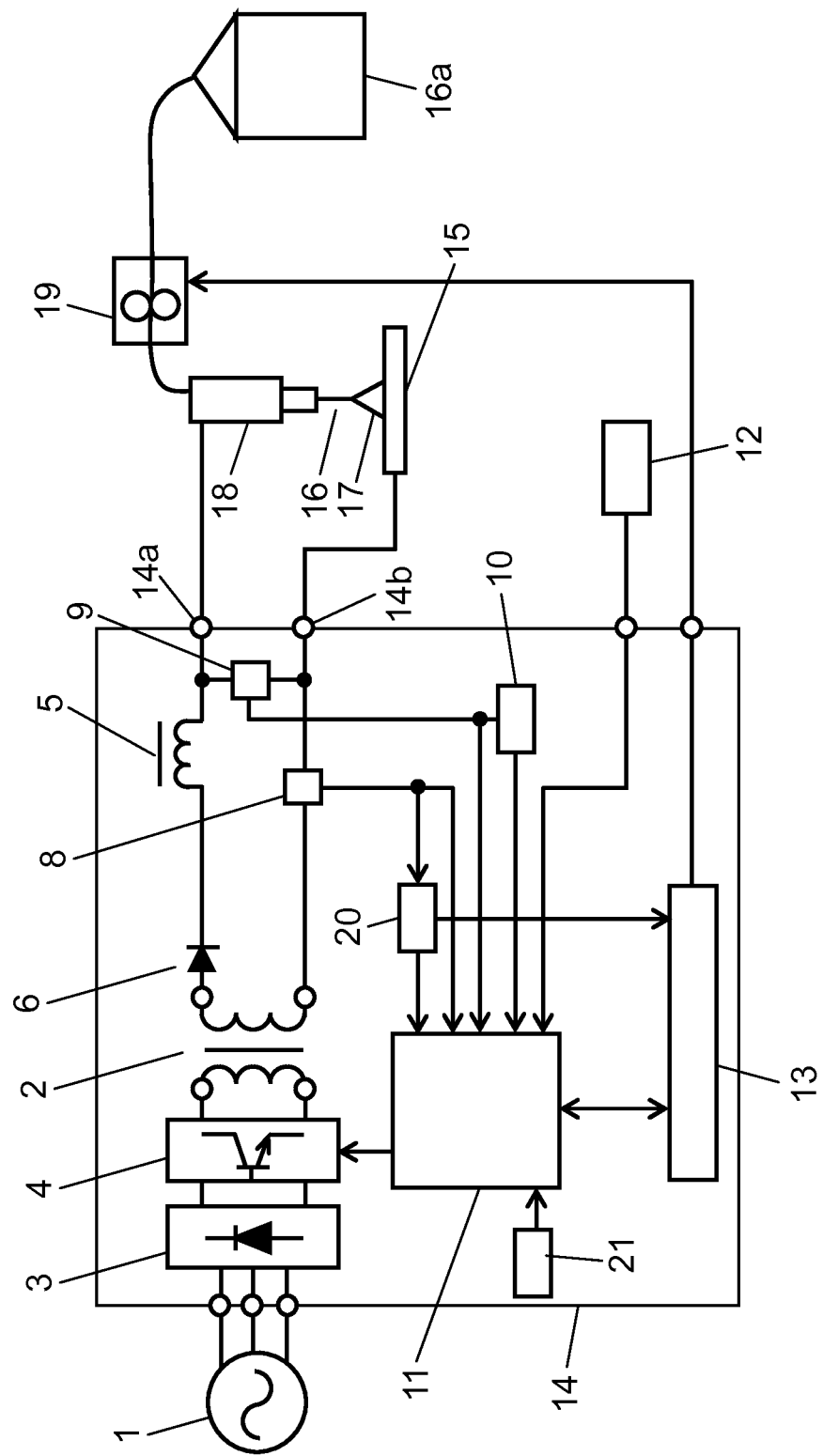
FIG. 1 is a view showing a schematic configuration of an arc welding apparatus in accordance with a first exemplary embodiment of the present invention.

FIG. 1 is a view showing a schematic configuration of an arc welding apparatus in accordance with this exemplary embodiment. In FIG. 1, welding power source 14 includes main transformer 2, primary-side rectifying element 3, switching element 4, reactor 5, secondary-side rectifying element 6, welding current detector 8, welding voltage detector 9, short-circuit/arc detector 10, output control unit 11, wire feed speed control unit 13, and timer section 20.

Primary-side rectifying element 3 rectifies an output of input power source 1 and outputs the rectified output. Switching element 4 converts a direct current output from primary rectifying element 3 into an alternating current so as to control a welding output. Main transformer 2 transforms the alternating current output of switching element 4. An output of main transformer 2 is output as a welding output via secondary-side rectifying element 6 for rectifying the secondary-side output of main transformer 2 and reactor 5. Welding voltage detector 9 detects a welding voltage, and welding current detector 8 detects a welding current.

Short-circuit/arc detector 10 determines whether the welding state is a short-circuit state in which a wire and a base material are brought into contact with each other and short-circuited, or an arc state in which a short-circuit is opened and an arc is generated, based on a signal from welding voltage detector 9. Output control unit 11 controls switching element 4 to control a welding output. Wire feed speed control unit 13 controls wire feed unit 19 to control the feed speed of wire 16. Timer section 20 counts predetermined time t1 from the beginning of the arc start. The beginning of the arc start signifies a time point at which welding is started by welding start instruction section 21, wire 16 is fed toward base material 15, a voltage is applied between wire 16 and base material 15, wire 16 and base material 15 are brought into contact with each other and a current flows, and this current is detected.

When a welding apparatus includes welding power source 14, wire feed unit 19 and a welding torch (not shown), and the like, welding start instruction section 21 is, for example, a torch switch of the welding torch. When a welding apparatus includes welding power source 14, wire feed unit 19, an industrial robot (not shown) that holds a welding torch (not shown), and a teaching pendant (not shown) for giving an instruction, and the like, welding start instruction section 21 is, for example, a switch provided in the teaching pendant.

Welding condition setting section 12 communicably connected to welding power source 14 by wired or wireless connection is provided for setting a welding current, a welding voltage, or the like. Output terminal 14a that is one of two output terminals 14a and 14b of welding power source 14 is connected to chip 18 that holds wire 16, and an electric power is supplied to wire 16 via chip 18. Furthermore, output terminal 14b that is the other of two output terminals 14a and 14b of welding power source 14 is connected to base material 15, and an electric power is supplied to base material 15. Arc 17 is generated between the tip end portion of wire 16 and base material 15. Wire feed unit 19 feeds wire 16 toward chip 18 from wire storage unit 16a for storing wire 16.

Figure 2:
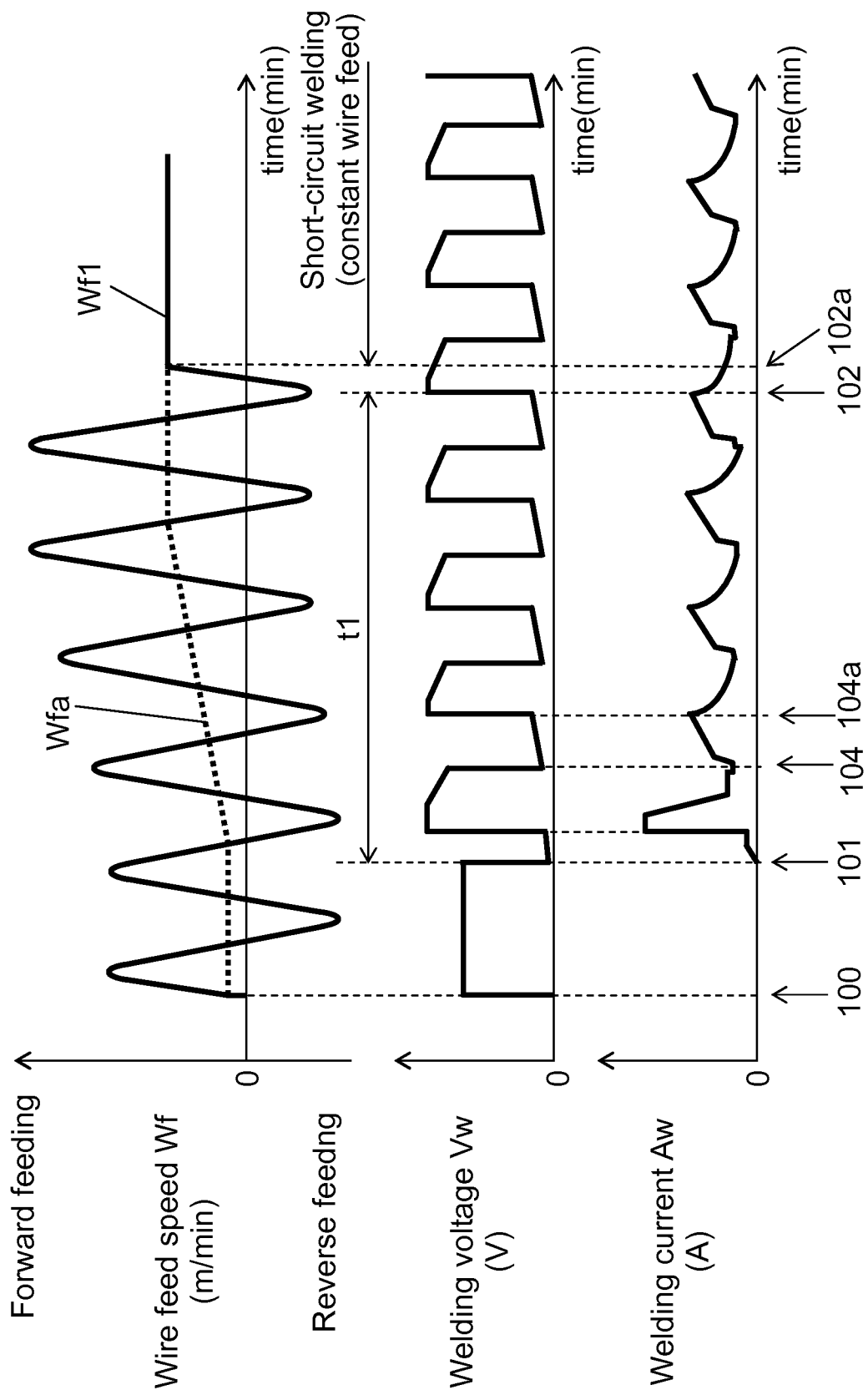
FIG. 2 shows graphs of waveforms of a welding current, a welding voltage and a wire feed speed in accordance with the first exemplary embodiment of the present invention.

Next, with reference to FIG. 2, wire feed speed Wf, welding voltage Vw and welding current Aw in an arc welding apparatus in accordance with this exemplary embodiment are described. FIG. 2 shows waveforms of wire feed speed Wf, welding voltage Vw and welding current Aw, showing an example in which the waveforms change over time.

In FIG. 2, at time point 100, starting of the arc welding apparatus (welding start instruction) is carried out. Then, when wire feed speed control unit 13 controls wire feed unit 19, wire 16 is fed forward and reverse with preset period and amplitude as shown in wire feed speed Wf.

A broken line part of wire feed speed Wf in FIG. 2 shows average wire feed speed Wfa. The average wire feed speed Wfa is determined by a welding current set by welding condition setting section 12. A storage section (not shown) stores a table or a formula for associating average wire feed speed Wfa with the set welding current. The average wire feed speed Wfa is determined from the contents of the storage section and the welding current set by welding condition setting section 12.

Time point 101 is a time point of the beginning of the arc start. When wire 16 and base material 15 are brought into contact with each other and a welding current flows, welding current detector 8 detects this current. This makes it possible to detect that the time point is the beginning of the arc start.

Until predetermined time t1 has passed from time point 101 as a starting time point, wire feed speed control unit 13 controls wire feed unit 19 so that wire 16 is fed with preset period and amplitude. Then, timer section 20 for counting an elapsed time from time point 101 provides wire feed speed control unit 13 with an output indicating that predetermined time t1 has passed from time point 101 and a time point becomes time point 102. Wire feed speed control unit 13 changes the wire feed speed from periodic one to constant wire feed speed Wf1 (constant value) so as to control wire feed after predetermined time t1 has passed. Specifically, after predetermined time t1 has passed and the wire feed speed is changed from reverse feeding to forward feeding and after time point 102a at which the wire feed speed becomes constant wire feed speed Wf1 that is determined corresponding to a welding current set by welding condition setting section 12, wire 16 is fed at the constant wire feed speed Wf1.

During predetermined time t1 from time point 101 to time point 102, wire feed changes periodically between forward feeding and reverse feeding. Therefore, the forward feeding of wire 16 forcedly generates a short-circuit between wire 16 and base material 15, and the reverse feeding of wire 16 forcedly opens a short-circuit so as to regenerate an arc. This makes it possible to open a short-circuit regardless of an electromagnetic pinch force of the welding current. Thus, generation of spatters can be reduced.

A form of shift of a droplet is a short-circuit shift because a short-circuit can be reliably generated by periodic feeding of wire 16. Therefore, since the shift is not a conventional separation and shift by pulse control, it is not affected by an arc reaction force. Thus, scattering of spatters can be suppressed and a molten pool can be formed.

In the welding current or welding voltage to be output, short-circuit/arc detector 10 detects whether the state is a short-circuit state or an arcing state based on the detection value of welding voltage detector 9, and output control unit 11 carries out waveform control of a welding current or a waveform control of a welding voltage suitable for the respective states, and a welding output is controlled by driving switching element 4.

Furthermore, FIG. 2 shows an example in which a periodic change of the wire feed speed is a sine waveform. However, the change is not necessarily limited to this and it may be a trapezoid waveform. The waveform may have any forms as long as they repeat periodically forward feeding and reverse feeding.

Furthermore, predetermined time t1 is about 0.1 to 2.0 seconds, and it may be any time as long as a molten pool can be formed at the early stage of the arc start. Predetermined time t1 can be determined by an experiment and the like for each subject to be welded. Predetermined time t1 is stored in a storage section (not shown), and can be set by welding condition setting section 12.

Herein, the reason why the wire feed speed is changed from a periodic speed to a constant speed after time point 102 (time point 102a in this exemplary embodiment) is described. The shape of a bead when welding is carried out by changing the wire feed speed periodically has a smaller welding penetration depth and the width of the bead is narrow as compared with the case where the welding is carried out with the wire feed speed constant. Therefore, there may be base materials and welding points that cannot be used in the normal welding condition (this welding condition). Thus, when such a base material or a welding portion is welded, it is necessary to change the form of wire feed speed Wf.

In the welding current or welding voltage to be output, in addition to the waveform control in which wire feed speed Wf is periodically changed, waveform control suitable for the case where the wire feed speed is made to be constant is carried out according to whether the state is a short-circuit state or an arc state.

FIG. 2 shows an example in which short-circuit welding is carried out both in a periodic wire feed speed and a constant wire feed speed.

FIG. 2 shows an example in which a periodic wire feed speed is employed from time point 100 at which the start of welding is instructed, but the periodic wire feed speed may be employed from time point 101 at which the start of welding is instructed and then wire 16 and base material 15 are brought into contact with each other (that is, time point 101 at which a contact between wire 16 and base material 15 as a material to be welded is detected). Until the periodic wire feed speed is employed, for example, certain constant wire feed speed Wf2 from time point 100 to time point 101 may be employed, which is smaller than the periodic wire feed speed and lower than the wire feed speed after the time point 102a.

Alternatively, periodic wire feed speed may be employed from time point 104 at which the first short-circuit occurs after the start of welding is instructed at time point 101 and wire 16 and base material 15 are brought into contact with each other and arc is generated at time point 101. In this case, it is desirable that the periodic wire feed speed starts from the reverse feeding. It is desirable because a short-circuit can be opened early when the reverse feeding is carried out at the time of the short-circuit.

Alternatively, periodic wire feed speed may be employed from time point 104a at which the first short-circuit is opened after the start of welding is instructed at time point 101 and wire 16 and base material 15 are brought into contact with each other and arc is generated at time point 101. In this case, it is desirable that the periodic wire feed speed starts from the forward feeding. It is desirable because short-circuit can be opened early when the reverse feeding is carried out at the time of short-circuit. In this case, it is desirable that the periodic wire feed speed starts from forward feeding. It is desirable because a short-circuit can be achieved early when the forward feeding is carried out at the time of the opening of the short-circuit.

Second Exemplary Embodiment

In this exemplary embodiment, the same reference numerals are given to the same portions as those in the first exemplary embodiment and the description thereof is omitted herein. This exemplary embodiment is different from the first exemplary embodiment in that pulse welding is carried out after predetermined time t1 has passed.

This exemplary embodiment is described with reference to FIGS. 1 and 3. When timer section 20 counts a lapse of predetermined time t1 from time point 101, at time point 102, wire feed speed control unit 13, which receives a signal showing that predetermined time t1 has passed from timer section 20, controls to change from the wire feed control of periodic forward feeding and reverse feeding to the wire control at constant wire feed speed Wf1 (constant value). Specifically, after predetermined time t1 has passed and the wire feed speed is changed from reverse feeding to forward feeding and after time point 102a at which the wire feed speed becomes constant wire feed speed Wf1 that is determined corresponding to a welding current set by welding condition setting section 12, wire 16 is fed at the constant wire feed speed Wf1.

At time point 102 at which predetermined time t1 has passed, when the periodic wire feed speed is forward feeding, the periodic wire feed is continued, and then it is made to be a constant wire feed speed Wf1 after it is changed from the forward feeding to the reverse feeding, and further to the forward feeding (that is to say, for example, after one period of wire is periodically fed from time point 102).

Next, changing of the welding output is described. As shown in FIG. 3, a wire feed state reaches a starting time point of the forward feeding at time point 103, output control unit 11 changes the welding output from the short-circuit control to the pulse control, and later than that, the pulse output control is carried out. In this way, when the wire feed state is changed to pulse welding in a state of the forward feeding, generation and adhesion of spatters can be prevented also at the time of being changed to pulse welding. This is because when pulse welding is carried out in the reverse feeding and a droplet is separated and shifted, a droplet formed at the tip end of wire 16 is easily shifted in the direction of the reverse feeding. That is to say, a droplet is easily moved in the direction separating from base material 15, and spatters easily occur. Therefore, in order to prevent a droplet from forming spatters, it is desirable that pulse welding is carried out in forward feeding and a droplet is separated and shifted.

Note here that wire feed is stopped once and one pulse is output at time point 103 at which the reverse feeding is changed to the forward feeding, and the droplet is separated to secure the arc length, and then the forward feeding may be started.

A method for controlling the arc start of the arc welding apparatus configured as mentioned above is described. When the plate thickness of base material 15 is, for example, more than 3 mm, in order to carry out excellent welding, penetration and a bead width are needed. Therefore, it is necessary to change the welding to pulse welding at time point 102 or later. In this case, as shown in FIG. 3, by applying a pulse from a starting time point of the forward feeding at time point 103 at which a wire feed speed reaches a changing timing at time point 102 and is accelerated from the reverse feeding to the forward feeding, spatters can be reduced. When a pulse is output in the reverse feeding, since a force acts in the direction in which wire is lifted up, a droplet is separated in the direction in which the wire is lifted up. Consequently, spatters are not separated to a molten pool but scattered to the outside.

Figure 3:
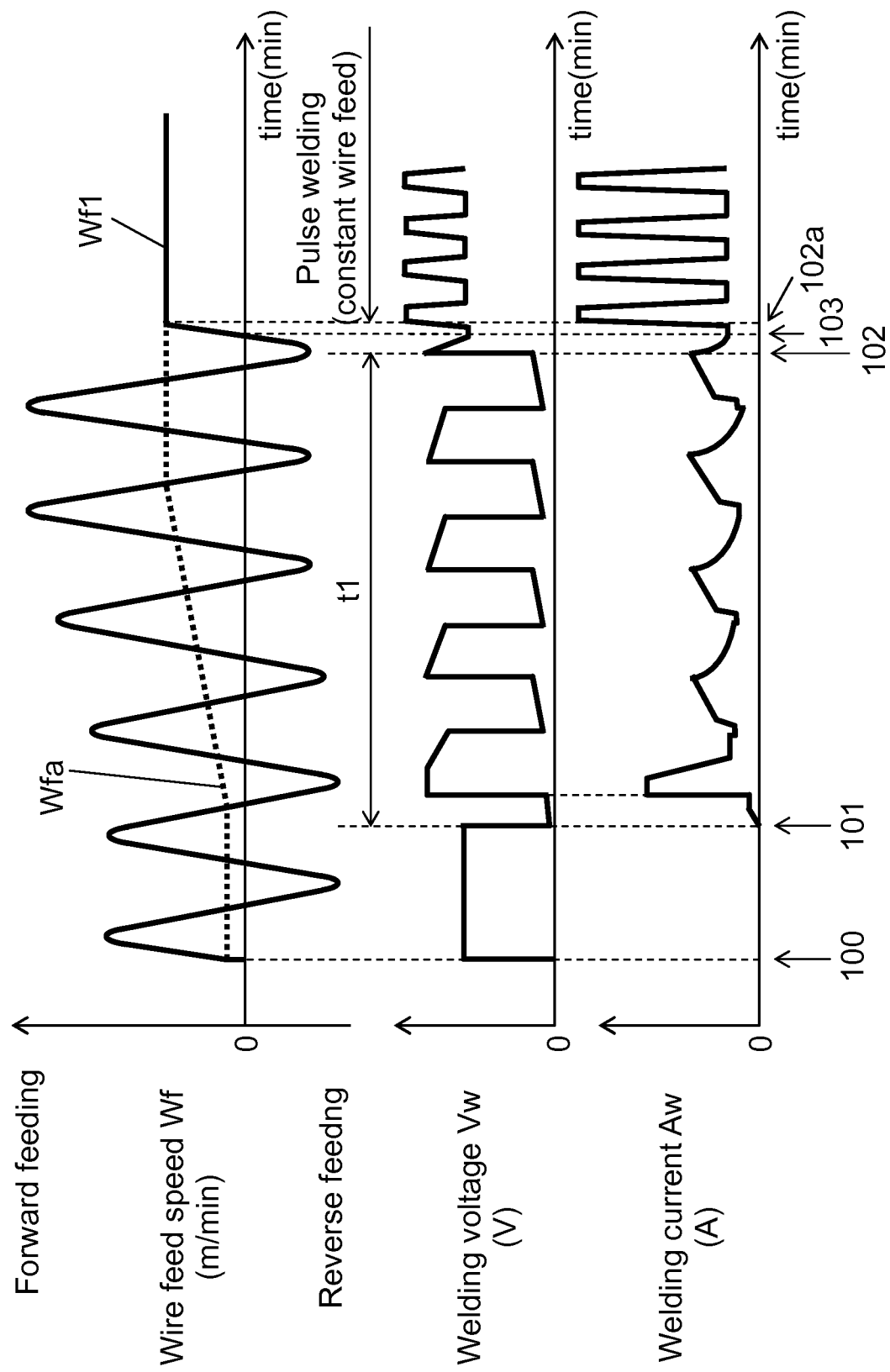
FIG. 3 shows graphs of waveforms of a welding current, a welding voltage and a wire feed speed in accordance with a second exemplary embodiment of the present invention.
Figure 4:
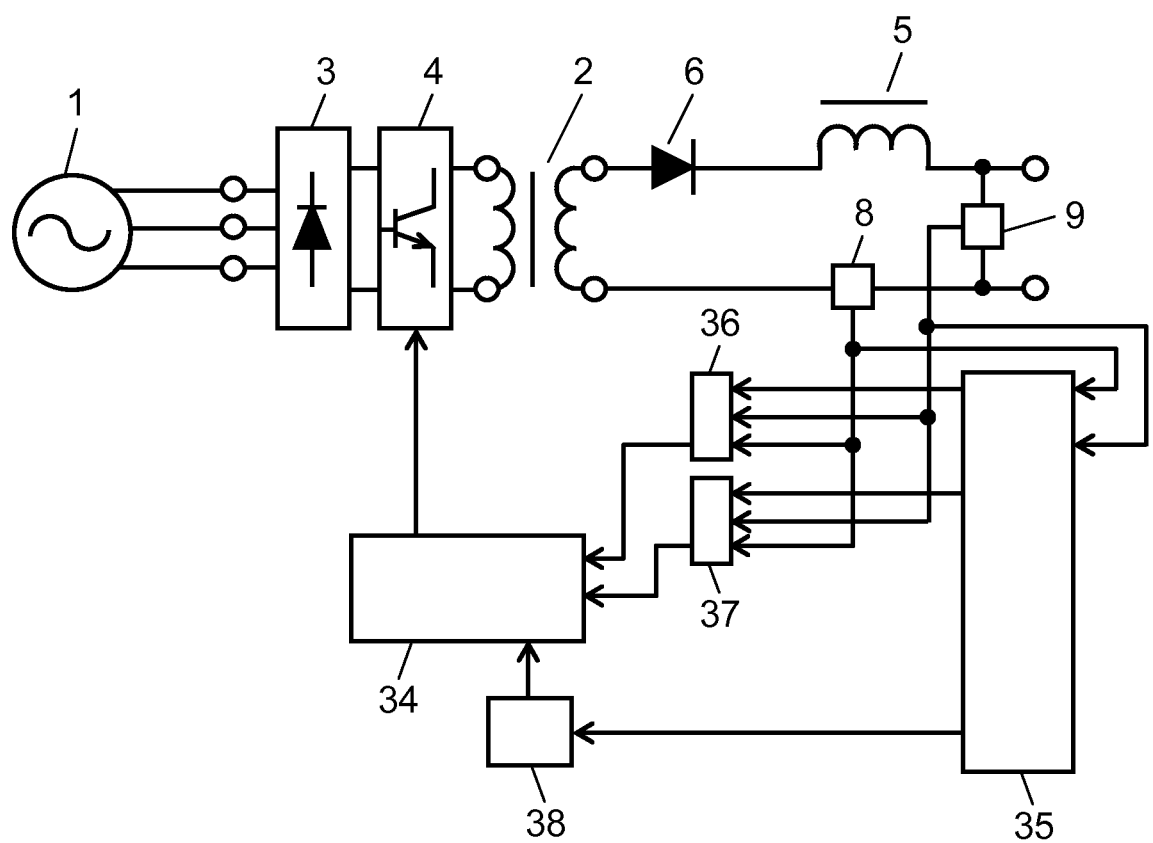
FIG. 4 is a view showing a schematic configuration of a conventional arc welding apparatus.
Figure 5:
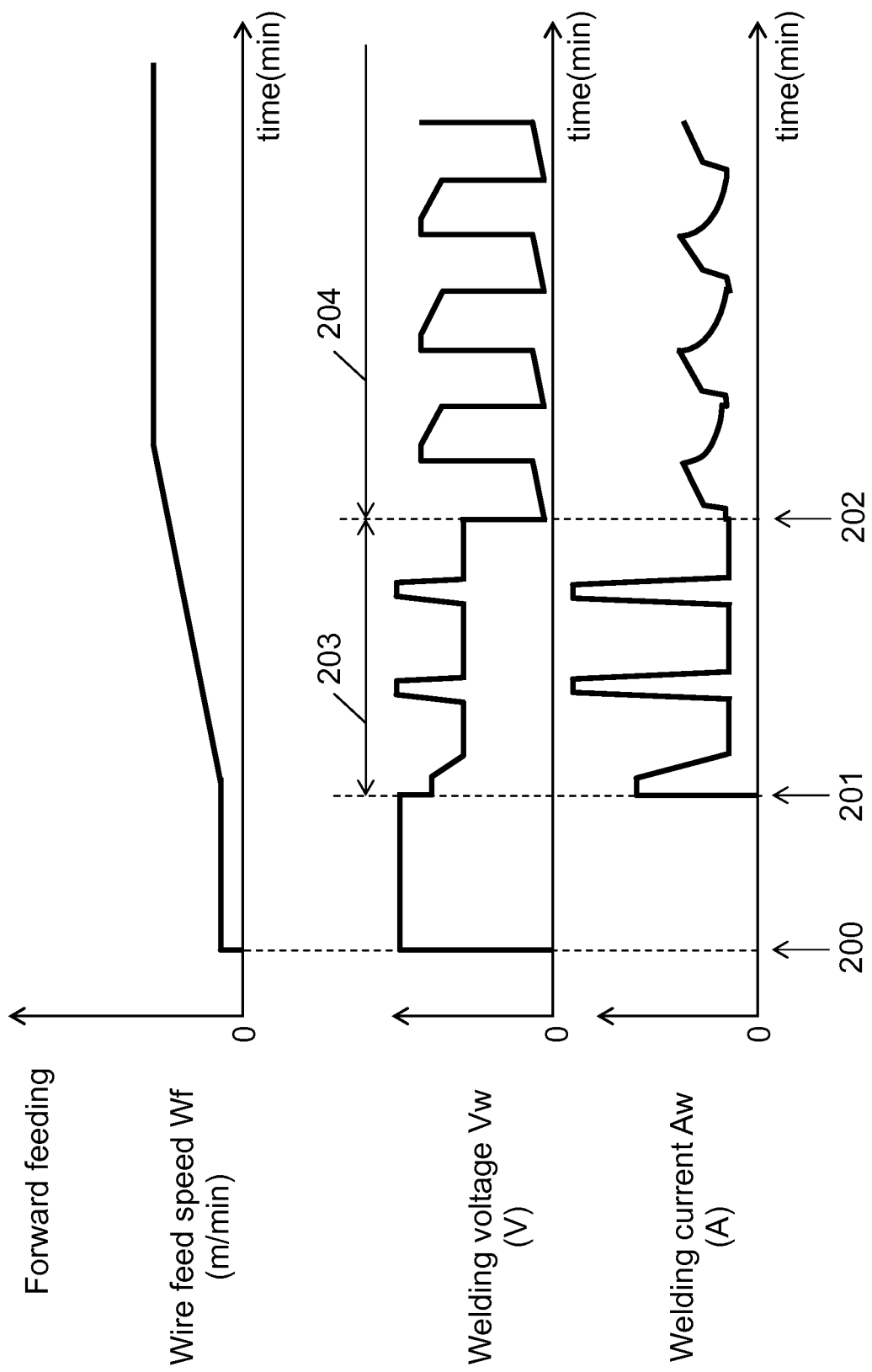
FIG. 5 shows graphs of waveforms of a welding current, a welding voltage and a wire feed speed in a conventional arc welding.
Figure 6:
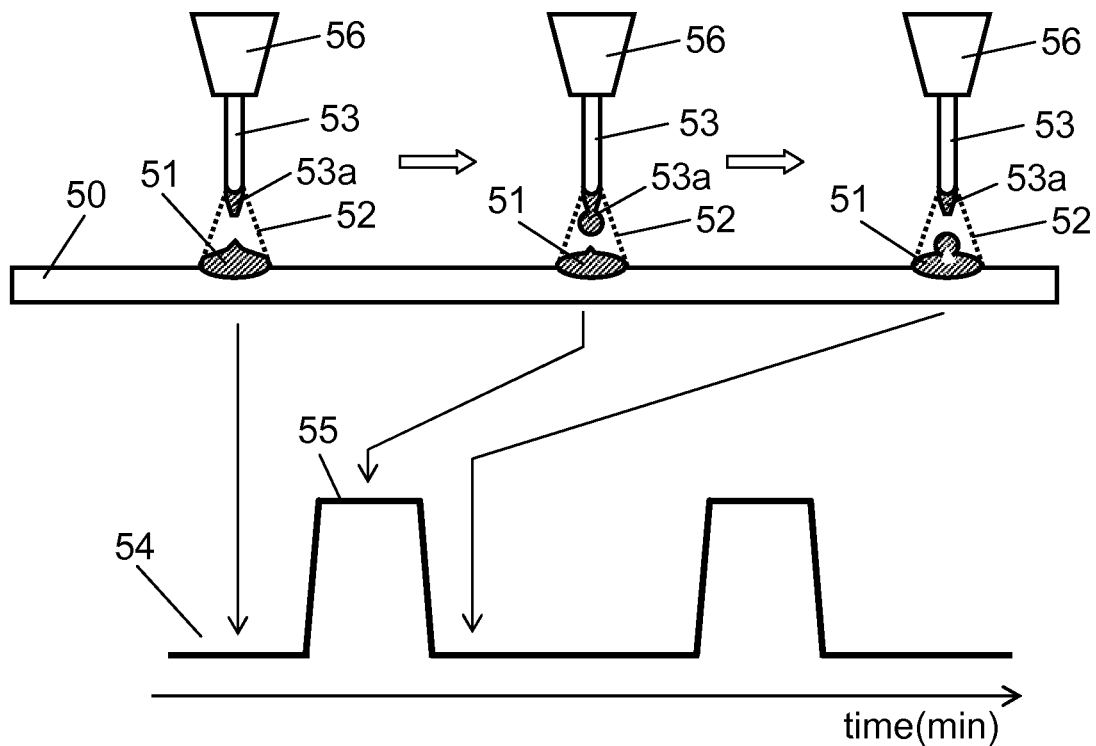
FIG. 6 is a view showing a behavior of a droplet when a molten pool is present in a base material in a conventional arc welding.
Figure 7:
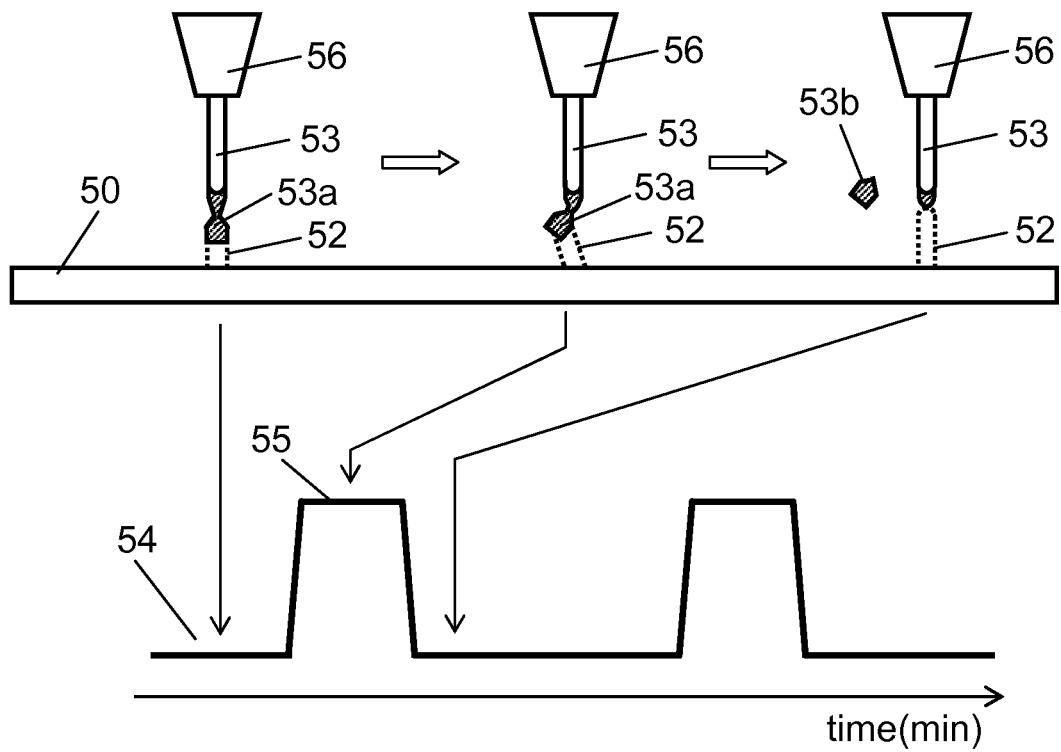
FIG. 7 is a view showing a behavior of a droplet when a molten pool is not present in a base material in a conventional arc welding.

Furthermore, in FIGS. 2 and 3, from the welding start instruction (start of welding) at time point 100, the wire feed speed is fed forward and reverse periodically. However, a current is detected at time point 101 by controlling to predetermined lower constant value Wf2 between, for example, time point 100 and time point 101, which is smaller than the periodic wire feed speed and lower than wire feed speed Wf1 after time point 102a, and then a lift-up start is executed to lift up the arm tip end of the arc welding robot. Thereafter, the wire feed speed may be controlled to the forward feeding and the reverse feeding with a predetermined period.

INDUSTRIAL APPLICABILITY

The present invention can reduce generation and adhesion of spatters at the start of an arc so as to improve the productivity of welding work, and therefore, it is particularly useful for an arc welding control method and an arc welding apparatus for carrying out arc starting control using a consumable electrode.

REFERENCE MARKS IN THE DRAWINGS

1 input power source
2 main transformer
3 primary-side rectifying element
4 switching element
5 reactor
6 secondary-side rectifying element
8 welding current detector
9 welding voltage detector
10 short-circuit/arc detector
11 output control unit
12 welding condition setting section
13 wire feed speed control unit
14 welding power source
14a, 14b output terminal
15 base material
16 wire
16a wire storage unit
17 arc
18 chip
19 wire feed unit
20 timer section
21 welding start instruction section

The invention claimed is:

1. An arc welding control method for carrying out welding by generating an arc between a welding wire as a consumable electrode and a material to be welded, the method comprising:
   an alternate feeding step of feeding the welding wire at an alternate wire feed speed of alternatively repeating forward feeding and reverse feeding from a first time point when a start of the welding is instructed, or from a certain time point after the first time point; and
   a constant feeding step of feeding the welding wire at a constant wire feed speed of forward feeding,
   wherein an average of the alternate wire feed speed is increased.

2. The arc welding control method of claim 1,
   wherein the certain time point is a second time point when a contact between the welding wire and the material to be welded is detected.

3. The arc welding control method of claim 2,
   wherein the constant feeding step starts after the first time point or the second time point, and when the alternate wire feed speed is changed from the reverse feeding to the forward feeding and the alternate wire feed speed reaches the constant wire feed speed determined according to a set value of a welding current.

4. The arc welding control method of claim 2,
   wherein a pulse welding is started after the first time point the second time point, and during the forward feeding in which the alternate wire feed speed is changed from the reverse feeding to the forward feeding.

5. The arc welding control method of claim 2,
   wherein the alternate feeding step starts when a third time point when a first short-circuit is generated after an arc generated after the first time point and the welding wire and the material to be welded are brought into contact with each other.

6. The arc welding control method of claim 5,
   wherein the alternate wire feed speed starts from the reverse feeding.

7. The arc welding control method of claim 2,
   wherein the alternate feeding step starts when a fourth time point when a first short-circuit is opened after an arc generated after the first time point and the welding wire and the material to be welded are brought into contact with each other.

8. The arc welding control method of claim 7,
   wherein the alternate wire feed speed starts from the forward feeding.

9. The arc welding control method of claim 1,
   wherein the average of the alternate wire feed speed is determined according to a set value of a welding current.

10. The arc welding control method of claim 1, wherein the alternate wire feed speed periodically repeats forward feeding and reverse feeding.

11. The arc welding control method of claim 10, wherein the alternate wire feed speed has a predetermined frequency and amplitude.

12. An arc welding apparatus for carrying out welding by generating an arc between a welding wire as a consumable electrode and a material to be welded, the apparatus comprising:
   a switching element for controlling a welding output;
   a welding voltage detector for detecting a welding voltage;
   a welding current detector for detecting a welding current;
   a welding condition setting section for setting a set current and a set voltage;
   a short-circuit/arc detector for detecting whether a state between the welding wire and the material to be welded is a short-circuit state or an arc state, based on an output of the welding voltage detector;
   a welding start instruction section for instructing a start of the welding;
   a timer section for counting a predetermined time from a time point as a starting time point for detecting an electric current flowing when the welding wire and the material to be welded are brought into contact with each other after the welding is started;

a wire feed speed control unit for controlling a wire feed speed by receiving an output of the short-circuit/arc detector and an output of the timer section; and an output control unit for controlling an output of the welding current or the welding voltage according to the output of the short-circuit/arc detector and the welding wire feed speed, wherein the welding wire is fed at an alternate wire feed speed of alternatively repeating forward feeding and reverse from a first time point when a start of the welding is instructed by the welding start instruction section, or from a certain time point after the first time point, and then the welding wire is fed at a constant wire feed speed of forward feeding, and wherein an average of the alternate wire feed speed is increased.

13. The arc welding apparatus of claim 12,
wherein the certain time point is a second time point when a contact between the welding wire and the material to be welded is detected.

14. The arc welding apparatus of claim 13,
wherein the welding wire is fed at the constant wire feed speed after the first time point or the second time point, and when the alternate wire feed speed is changed from the reverse feeding to the forward feeding and the alternate wire feed speed reaches the constant wire feed speed determined according to the set current.

15. The arc welding apparatus of claim 12, wherein the alternate wire feed speed periodically repeats forward feeding and reverse feeding.

16. The arc welding apparatus of claim 15, wherein the alternate wire feed speed has a predetermined frequency and amplitude.

* * * * *